United States Patent
Ito et al.

(10) Patent No.: US 12,109,964 B2
(45) Date of Patent: Oct. 8, 2024

(54) AIRBAG DEVICE

(71) Applicants: Yoshiki Ito, Kanagawa (JP); Yutaka Nakajima, Kanagawa (JP); Autoliv Development AB, Vargarda (SE)

(72) Inventors: Yoshiki Ito, Kanagawa (JP); Yutaka Nakajima, Kanagawa (JP)

(73) Assignee: Autoliv Development AB, Vargarda (SE)

(*) Notice: Subject to any disclaimer, the term of this patent is extended or adjusted under 35 U.S.C. 154(b) by 0 days.

(21) Appl. No.: 18/000,037

(22) PCT Filed: Apr. 28, 2021

(86) PCT No.: PCT/JP2021/017050
§ 371 (c)(1),
(2) Date: Nov. 28, 2022

(87) PCT Pub. No.: WO2021/241126
PCT Pub. Date: Dec. 2, 2021

(65) Prior Publication Data
US 2023/0202419 A1 Jun. 29, 2023

(30) Foreign Application Priority Data
May 28, 2020 (JP) .................................. 2020-093217

(51) Int. Cl.
*B60R 21/207* (2006.01)
*B60R 21/231* (2011.01)
*B60R 21/237* (2006.01)

(52) U.S. Cl.
CPC ...... *B60R 21/207* (2013.01); *B60R 21/23138* (2013.01); *B60R 21/237* (2013.01); *B60R 2021/23146* (2013.01)

(58) Field of Classification Search
CPC .......... B60R 21/207; B60R 2021/2074; B60R 2021/2375; B60R 21/237; B60R 21/23138
(Continued)

(56) References Cited

U.S. PATENT DOCUMENTS

| 7,163,232 B2* | 1/2007 | Yokoyama ............ B60R 21/201 |
| | | 280/730.2 |
| 7,344,154 B2* | 3/2008 | Yokoyama ............ B60R 21/237 |
| | | 280/730.2 |

(Continued)

FOREIGN PATENT DOCUMENTS

| JP | 2003-175792 A | 6/2003 |
| JP | 2007-91177 A | 4/2007 |

(Continued)

OTHER PUBLICATIONS

English translation and original doc for Nakurawa JP-2016203945-A, filed Dec. 2016, retrieved Nov. 2023 (Year: 2016).*

*Primary Examiner* — Amy R Weisberg
*Assistant Examiner* — Caitlin Anne Miller
(74) *Attorney, Agent, or Firm* — Harness, Dickey & Pierce, P.L.C.; Stephen T. Olson (57) ABSTRACT

An airbag device provided with an airbag and inflator integrally covering the head and side sections of an occupant seated in a vehicle seat. The airbag, includes, during expansion and deployment, a head protecting chamber that covers the head of the occupant and side protecting chambers that cover the side sections of the occupant, and is stowed in a rolled state, for example, from a first side of the backrest of the vehicle seat to the second side over the upper portion. An additional folding part is provided on the outer periphery of the airbag extending from the attachment end side to the (Continued)

backrest so as to cover at least a part of the outer periphery of the airbag on the side opposite to the seated occupant.

14 Claims, 13 Drawing Sheets

(58) Field of Classification Search
USPC .................................................. 280/728.2
See application file for complete search history.

(56) References Cited

U.S. PATENT DOCUMENTS

| | | | |
|---|---|---|---|
| 7,766,376 B2* | 8/2010 | Yokoyama | B60R 21/237 280/730.2 |
| 7,806,433 B2* | 10/2010 | Mitsuo | B60R 13/0225 280/730.2 |
| 8,573,636 B2* | 11/2013 | Berntsson | B60R 21/237 280/730.2 |
| 10,202,095 B2* | 2/2019 | Ohno | B60R 21/215 |
| 10,471,920 B2* | 11/2019 | Dry | B60R 21/2165 |
| 2012/0068443 A1 | 3/2012 | Berntsson | |

FOREIGN PATENT DOCUMENTS

| JP | 2008-56116 A | 3/2008 |
|---|---|---|
| JP | 2016-203945 A | 12/2016 |

\* cited by examiner

AIRBAG DEVICE

TECHNICAL FIELD

The present invention relates to an airbag device that integrally protects the head and the sides of the shoulders, upper arms, and chest of an occupant when the vehicle crashes or rolls over, for example, and that is capable of additionally protecting up the sides of the abdomen and waist, when needed.

Hereinafter, in the present application, "above" and "upper" mean the head direction of an occupant in a regular seating position seated in a vehicle seat, and "below" and "lower" mean the foot direction of the occupant in the same position. Moreover, "front" and "forward" refer to the front direction of the occupant seated in a vehicle seat in the regular condition, while "rear" and "rearward" similarly refer to the back direction of an occupant seated in the same position. Moreover, "left" and "left side" refer to the left-hand direction of the occupant seated in the vehicle seat in the regular condition, while "right" and "right side" similarly refer to the right-hand direction of the occupant in the same position.

BACKGROUND TECHNOLOGY

In recent years, airbag devices have been proposed in which a hood-shaped (shell-shaped) airbag expands and deploys from a stowing part of a vehicle seat to cover and protect the head of an occupant and the sides of the shoulder, upper arm, and chest of the occupant in the event of a vehicle collision or rollover for example (for example, Patent Documents 1 and 2).

Figure 9:
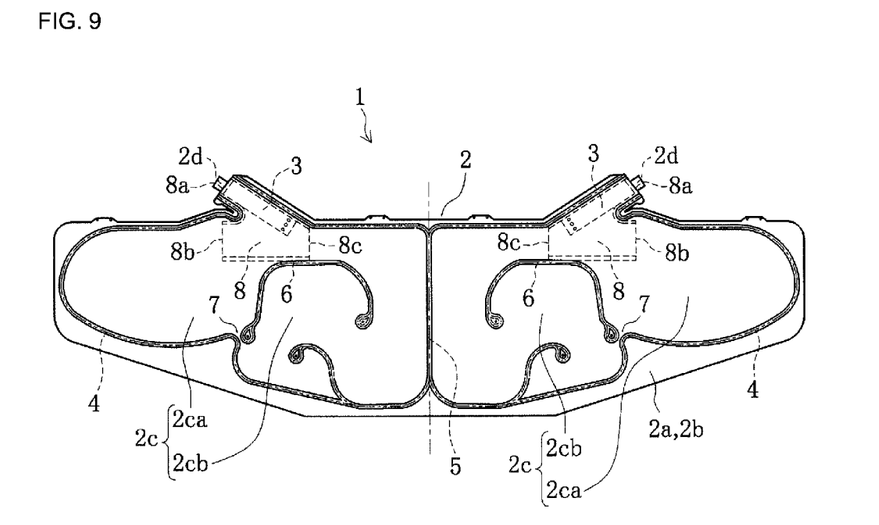
FIG. 9 is a diagram illustrating an example of the deployment of the airbag of the airbag device integrally covering and protecting the occupant head, and side sections of the occupant shoulders, upper arms, and chest.

For example, as illustrated in FIG. 9, an airbag 2 of this type of airbag device 1 has a shape that is longer in the horizontal direction than in the vertical direction when the unexpanded airbag 2 is spread out and laid flat on a flat surface. In a state in which the same two sheets 2*a* and 2*b* are superimposed, the outer periphery and the central part in the left-right direction are sewn together to provide the sewn sections 4 and 5, so that similar expandable chambers 2*c* are formed on both the left and right sides of the sewn section 5.

By sewing the insides of the left and right chambers 2*c* with sewn sections 6, side protecting chambers 2*ca* positioned at both the left and right ends of the airbag 2 and head protecting chambers 2*cb* positioned at the center of the airbag 2 in the left-right direction are formed.

In the airbag 2 of FIG. 9, one end side of the sewn section 6 is not continuous with the sewn section 4 of the outer periphery, thereby forming the ventilating port 7 between the side protecting chambers 2*ca* and the head protecting chamber 2*cb*. When expansion of the side part protection chamber 2*ca* is completed, the ventilating port 7 supplies gas to the head region protection chamber 2*cb* by gas flowing from the side part protection chambers 2*ca* to the head region protection chamber 2*cb*.

In the airbag 2, for example, the left and right chambers 2*c* are formed with insertion parts 2*d* for the inflators 3, respectively, gas is supplied to the left and right chambers 2*c* from separate inflators 3, and the left and right chambers 2*c* are configured to expand in a fluidly independent manner.

In the airbag 2, a substantially Y-shaped gas guide 8 is provided in the insertion part 2*d*. This gas guide 8 has an inlet 8*a* into which the inflator 3 is inserted, a first outlet 8*b* that guides the gas ejected from the inflator 3 to the side protecting chambers 2*ca*, and a second outlet 8*c* that guides the gas to the head protecting chambers 2*cb*. A cross-sectional area of the first outlet 8*b* and second outlet 8*c* are appropriately determined based on an amount of gas supplied to the side protecting chambers 2*ca* and head protecting chamber 2*cb*.

Figure 10:
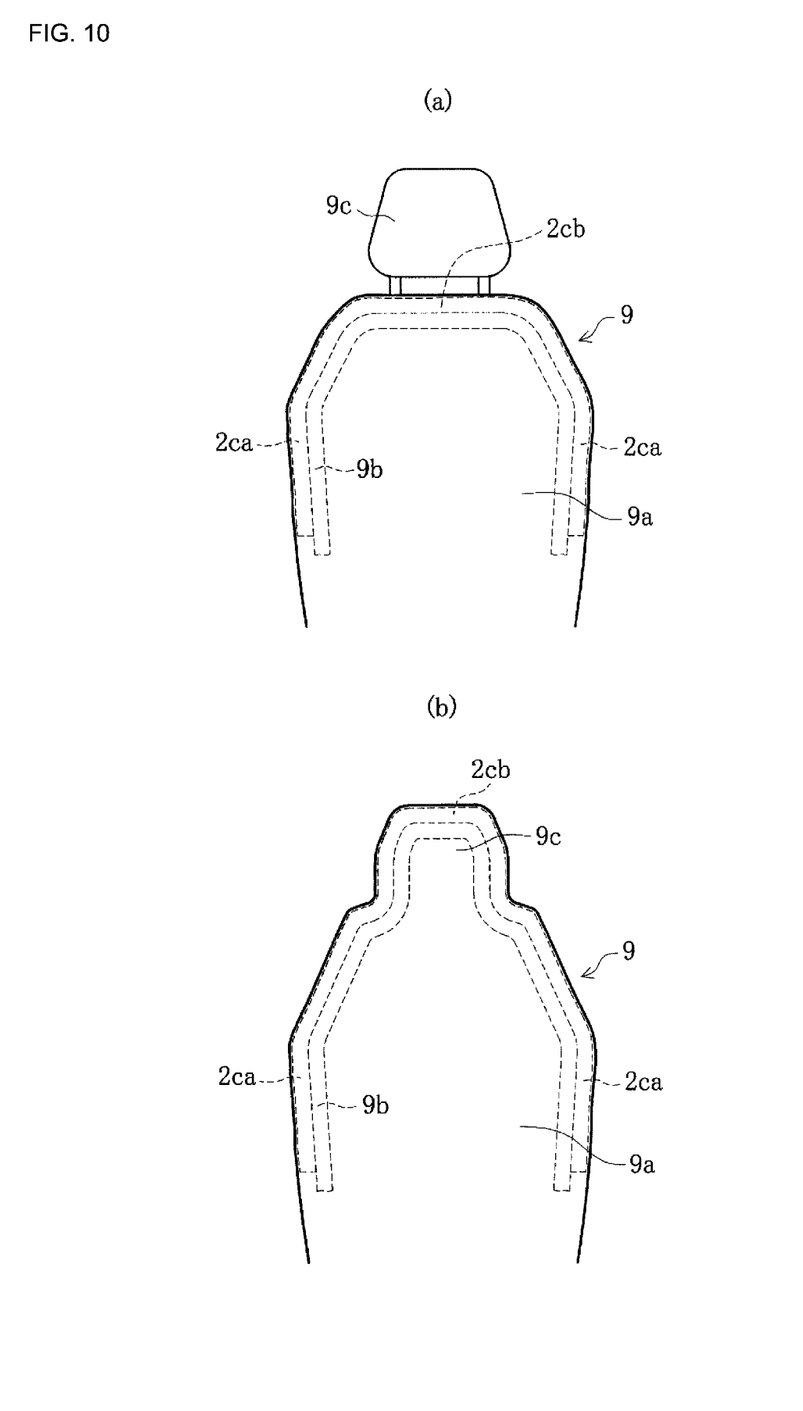
FIG. 10 is a diagram of a vehicle seat to which the airbag device of FIG. 9 is attached, as viewed from the rear of the vehicle, where (a) illustrates a headrest separately attached to the backrest of the vehicle seat and (b) illustrates a headrest integrally formed with the backrest.

As illustrated in FIG. 10(*a*), the airbag 2 is stowed in a roll shape, for example, extending from a first side of a frame 9*b* that supports the backrest 9*a* of the vehicle seat 9 to a second side of the frame 9*b* via the upper part. Specifically, the head protecting chamber 2*cb* is stowed in the upper part of the backrest 9*a*, and the side protecting chambers 2*ca* are housed in the left and right sides of the backrest 9*a* at positions separated from each other and opposed to each other. As illustrated in FIG. 10(*b*), the upper part of the backrest 9*a* means the upper section of the headrest 9*c* in the case of the vehicle seat 9 in which the backrest 9*a* and the headrest 9*c* are integrally formed.

PRIOR ART DOCUMENTS

Patent Documents

Patent Document 1: Japanese Unexamined Patent Application 2019-14477

Patent Document 2: Japanese Unexamined Patent Application 2018-83554

SUMMARY OF THE INVENTION

Problem to be Solved by the Invention

Figure 11:
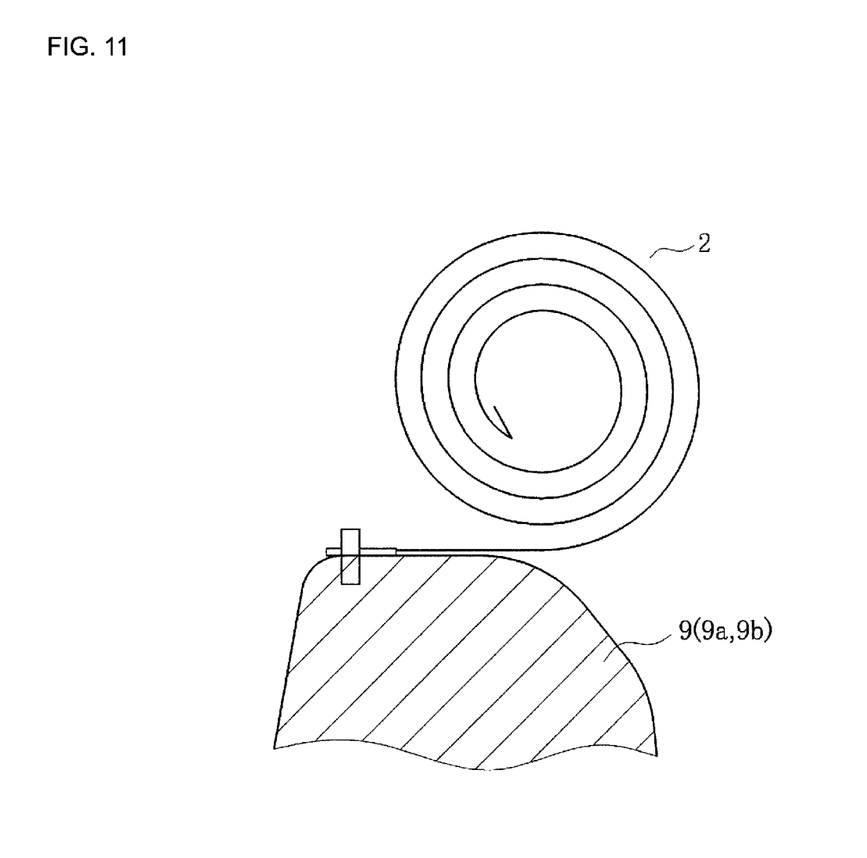
FIG. 11 is a diagram illustrating a state in which the head protecting chamber of the airbag constituting the airbag device in FIG. 9 is attached to the upper part of the backrest of the vehicle seat.
Figure 12A:
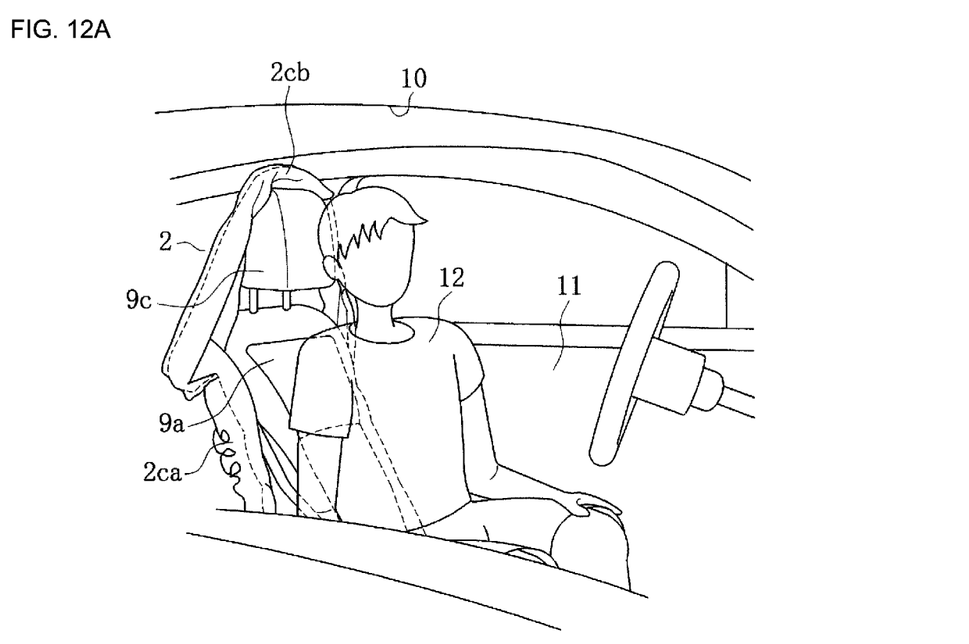
FIG. 12A is a perspective view of the airbag device in FIG. 9 immediately after starting expansion and deployment.
Figure 12B:
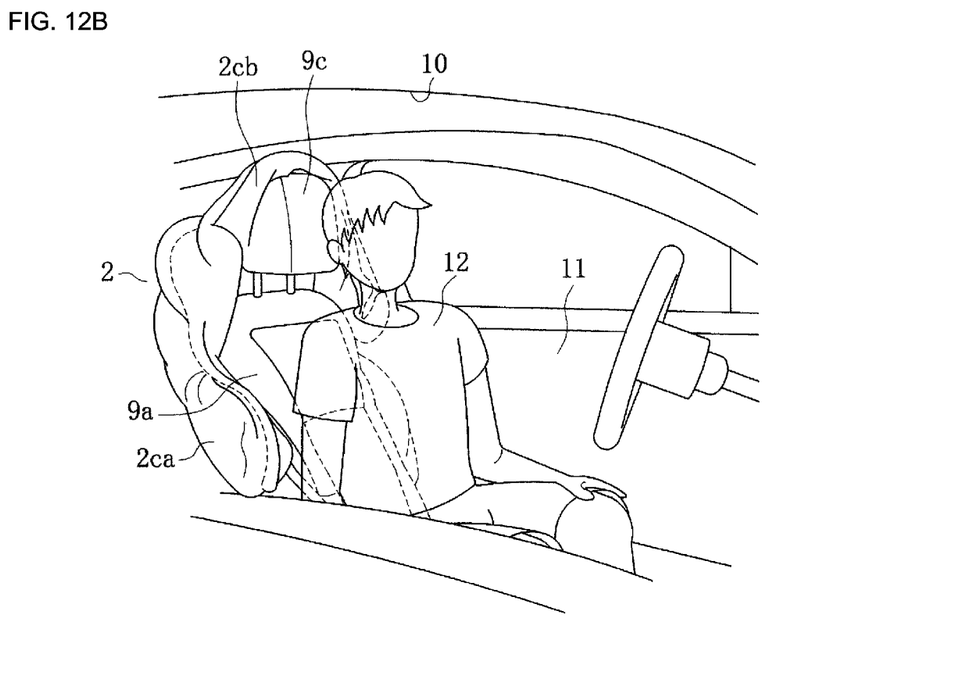
FIG. 12B is a perspective view of the airbag device in FIG. 9 in the initial stages of expansion and deployment.
Figure 12C:
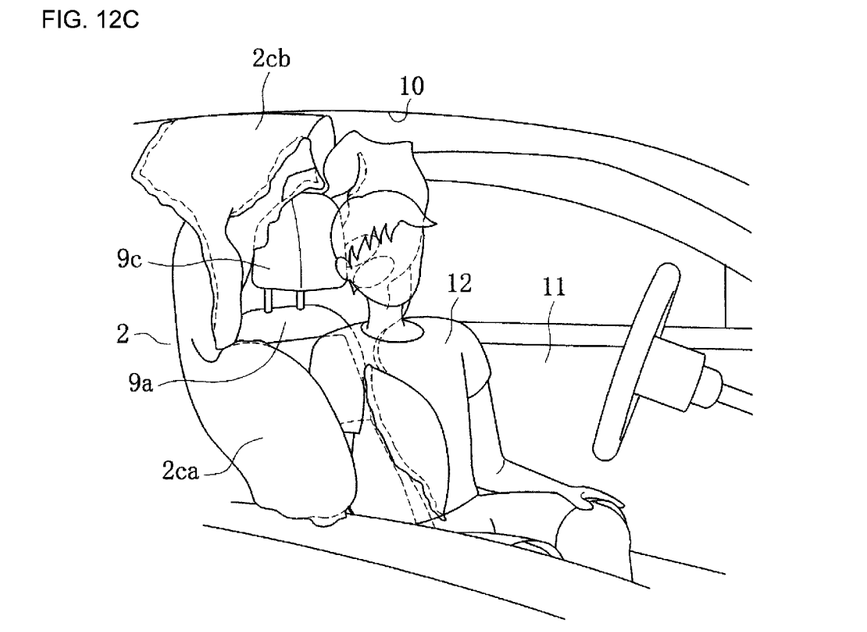
FIG. 12C is a perspective view of the airbag device in FIG. 9 in the middle of expansion and deployment.
Figure 12D:
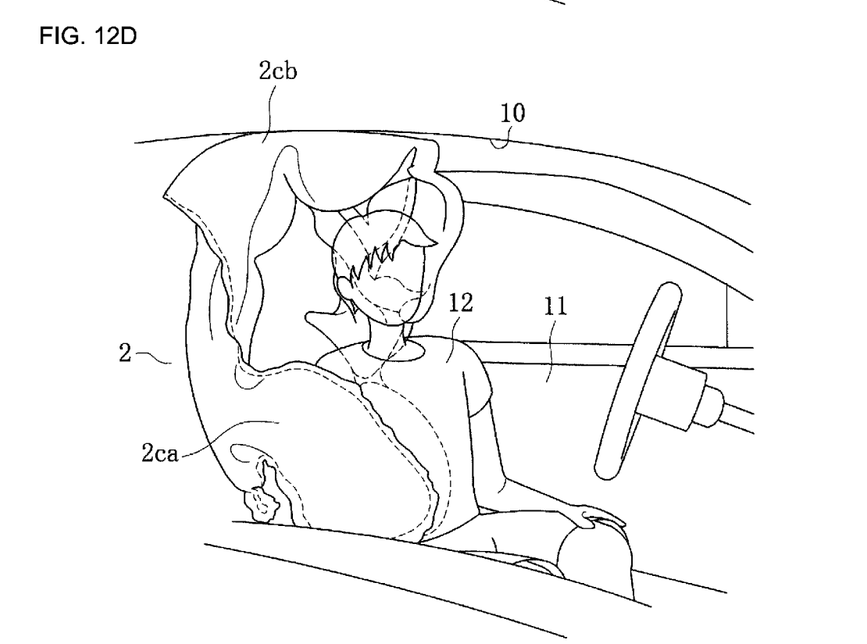
FIG. 12D is a perspective view of the airbag device in FIG. 9 in the later stages of expansion and deployment.
Figure 12E:
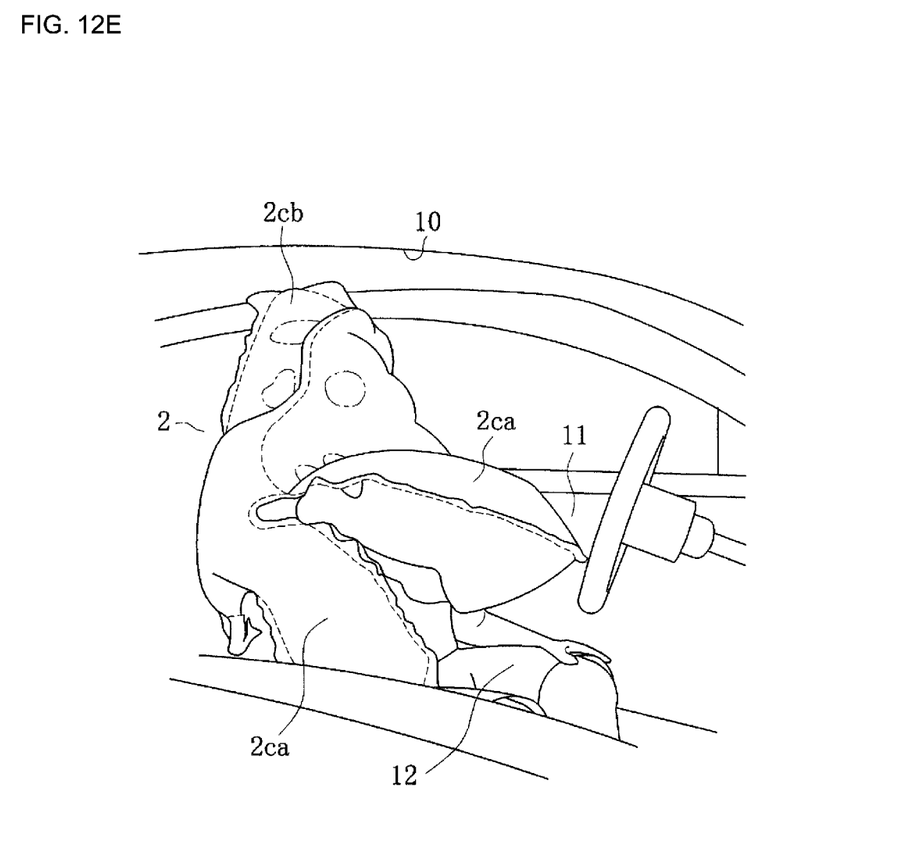
FIG. 12E is a perspective view of the airbag device in FIG. 9 when expansion and deployment is completed.

Incidentally, in automobiles of recent years, the distance between the vehicle seat 9 accommodating the airbag 2 as described above and the roof or interior parts of the vehicle compartment has become narrower. Therefore, as illustrated in FIG. 11, for example, when the airbag 2 is simply rolled into a roll and stowed in the backrest 9*a*, in the process of expanding and deploying the airbag 2 from the stowed state illustrated in FIG. 10 to what is illustrated in FIG. 12A to FIG. 12E, there may be interference between the airbag 2 and a roof 10 and interior parts 11 of the passenger compartment (see FIG. 12C and FIG. 12D). When there is interference between the airbag 2 and the roof 10 and interior parts 11 of the passenger compartment during expansion and deployment, the direction of expansion and deployment of the airbag 2 changes, and the initial protection performance may not be demonstrated. In this case, the occupant 12 cannot be properly protected.

The problem to be solved by the present invention is that when an airbag is simply rolled up and stowed in the backrest of a vehicle seat, there is interference with the roof and interior parts when expanding and deploying, and the direction of expansion and deployment is limited and may change, which brings the point that the initial protective performance may not be demonstrated.

The present invention solves the above-mentioned problems, an object being to prevent interference of the airbag with the roof or interior parts during expansion and deployment even if the space between the vehicle seat and the roof or interior parts of the passenger compartment is narrow, and to enable the desired protective performance to be demonstrated.

Means for Solving the Problems

In other words, the present invention is an airbag device including an airbag that expands and deploys to integrally cover the head and side portions of an occupant seated on a vehicle seat, and an inflator that supplies gas to the airbag.

The airbag, in a state of completed expansion and deployment, has a head protecting chamber that covers from the top of the head to the sides of the head of an occupant, and side protecting chambers that cover the sides of the occupant, and in a stowed state of being stowed from a first side to a second side of the backrest of the vehicle seat via the upper part of said seat and rolled in a roll shape or folded in a bellows shape, has an additional folding part provided on the outer periphery extending from the attachment end side of the airbag in a folded state to the backrest.

Specifically, the head protecting chamber is stowed in the upper section of the backrest, and the side protecting chambers are stowed in the left and right side portions of the backrest at positions spaced apart from each other and opposed to each other. In the case of a vehicle seat in which the backrest and the headrest are integrally formed, the upper part of the backrest means the upper part of the headrest.

In the present invention, an additional folding part is provided on a portion of the outer periphery extending from the attachment end side of the airbag in the rolled or folded state to the backrest. A feature of the present invention is that the additional folding part is provided so as to cover at least a portion of the rear side of the rolled or bellows-folded portion of the airbag in a stowed state. Here, "a portion of the rear side" is a portion of the side opposite to the seated occupant.

Specifically, the additional folding part extends from the vicinity of the surface of the backrest to the vicinity of the upper section along the shape of the outer periphery on the opposite side of the airbag in the stowed state, and is folded downward near this upper section, is connected to the remaining portion of the outer periphery via the folded portion, and is provided so as to reach the vicinity of the surface of the backrest.

Effect of the Invention

In the present invention, the additional folding part is first expanded and deployed to form a guide wall that determines the direction of expansion and deployment of the airbag, such that the head protecting chamber and side protecting chambers that expand and deploy afterwards can demonstrate protection performance without interference.

In the present invention, the reason why the additional folding part covers the outer periphery of the airbag in the stowed state on the side opposite to the seated occupant is because if the additional folding part were to cover the side of the seated occupant, it would become difficult to provide expansion and deployment in a manner achieving the role of the guide wall that determines the expansion and deployment direction of the airbag.

Moreover, the additional folding part preferably further covers the top portion of the airbag in a rolled or bellows-folded state. This is because if the airbag has a length that covers not only the outer periphery of the airbag on the side opposite to the seated occupant, but also the top portion of the airbag, the effect of the guide wall that determines the expansion and deployment direction of the airbag is improved.

Moreover, it is desirable that the additional folding part also covers a portion of the upper part of the seated occupant side that is continuous from the top portion of the airbag via the top portion. This is because the direction of expansion and deployment of the airbag can be determined more reliably if there is enough length to cover a part of the upper section of the seated occupant side that is continuous from the top portion of the airbag through said top portion.

Moreover, the additional folding part is preferably provided at least in a section corresponding to the head protecting chamber. This is because the roof in the passenger compartment is the main part that interferes with the expansion and deployment of the airbag.

In the present invention, first, the additional folding part expands and deploys to form the guide wall. By forming the guide wall at a position where there is no interference with the head protecting chamber and the side protecting chambers guided by the guide wall and the roof and interior parts, there is no interference between the chambers that are expanded and deployed afterwards and the roof or interior parts. Therefore, the desired protective performance can be exhibited, and the occupant can be properly protected.

MODE FOR CARRYING OUT THE INVENTION

If the airbag is simply rolled or folded into a bellows shape and stowed in the backrest of the vehicle seat, there will be interference with the roof and interior parts upon expansion and deployment, which may cause the desired protection performance not to be obtained.

In the present invention, the above problems are solved by providing an additional folding part that covers at least a portion of the outer periphery of a stowed airbag on the side opposite to the seated occupant, the outer periphery extending from the attachment end side of the airbag in a rolled shape, for example, to the backrest.

Embodiments of the present invention will be described below with reference to FIG. 1 to FIG. 8.

The airbag device 21 of the present invention is provided with an airbag 22 that expands and deploys to cover the head 12a, and the side sections of the shoulder 12b, upper arm 12c, and chest 12d of an occupant 12 seated in a vehicle seat 9 during a collision or rollover of a vehicle, and an inflator 3 that emits gas into the airbag 22. The airbag 22 is formed with chambers 2c having the same symmetrical shape on the left and right sides thereof. The chambers 2c include, in a state where expansion and deployment is complete, head protecting chambers 2cb that cover the head 12a of the occupant 12 (specifically, from the head to the side of the head), and side protecting chambers 2ca that cover the side section of the occupant 12. Note that with respect to the chambers 2c, side protecting chambers 2ca, and head protecting chamber 2cb, "chamber" refers not only to the interior space, but also the bag including the sheets that form that interior space.

The vehicle seat 9 is provided with a seat cushion 9d and a backrest 9a. A headrest 9c is integrally formed on an upper portion of the backrest 9a or is separately attached. The seat cushion 9d and backrest 9a are supported by a frame 9b (see FIG. 10).

Figure 1:
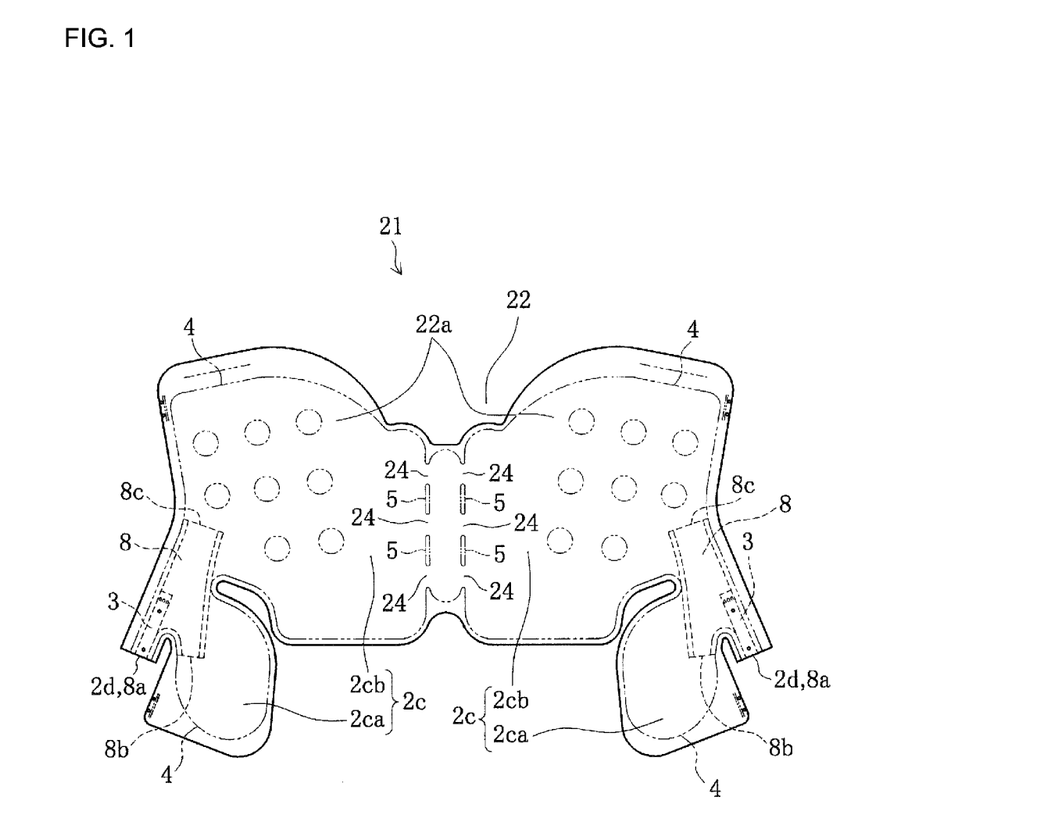
FIG. 1 is a diagram illustrating an unexpanded state of Embodiment 1 of an airbag constituting an airbag device of the present invention laid flat on a surface.

An example of the airbag 22 is illustrated in FIG. 1. The airbag 22 in FIG. 1 differs from the airbag 2 in FIG. 9 particularly in the following points.

The attachment position of the inflator 3 is set to the lower part of the left and right sides of the airbag 22.

An additional folding part 22a is provided on a part of the outer periphery of the airbag 22 in a rolled state, for example, extending from the attachment end 22c side to the backrest 9a of the vehicle seat 9.

A ventilating port 24 is provided in a sewn section 5 in the central part in the left-right direction to allow the left and right chambers 2c to communicate with each other.

Figure 2:
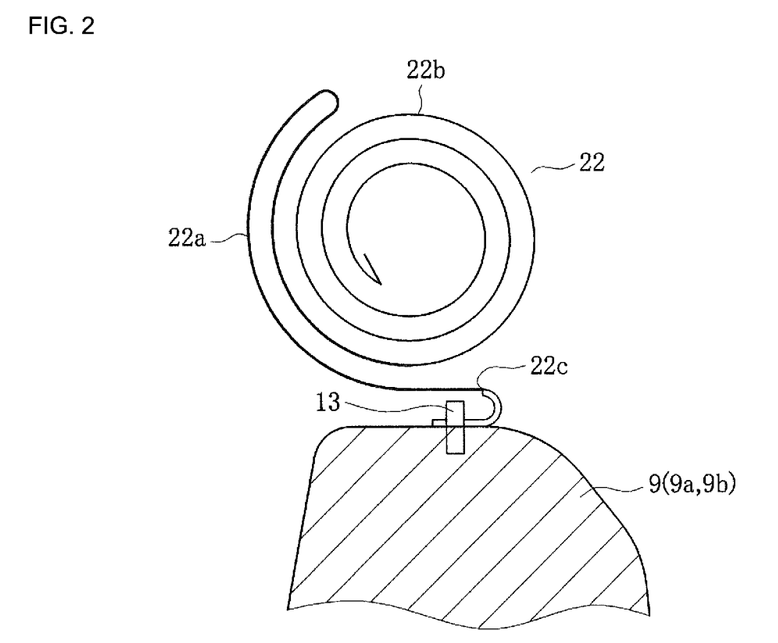
FIG. 2 is a diagram illustrating a state in which the head protecting chamber of Embodiment 1 illustrated in FIG. 1 is attached to the upper section of a backrest of a vehicle seat.

When the airbag 22 is placed in a flat condition as illustrated in FIG. 1, the airbag 22 is rolled from the front side to the rear side or folded from the front side to the rear side in a bellows shape, thereby shortening the dimension in the front-to-back direction, and thus the airbag 22 is in a stowed state when stowed in the backrest 9a. As illustrated in FIG. 10, the airbag 22 is stowed in a roll shape, for example, extending from a first side of a frame 9b that supports the backrest 9a of the vehicle seat 9 to a second side of the frame 9b via the upper part. At this time, the side protecting chambers 2cb and head protecting chambers 2ca are stowed in the upper part of the backrest 9, respectively, at both left and right sides of the backrest 9, facing each other and separated from each other. As illustrated in FIG. 2, the additional folding part 22a is provided on a portion of the outer periphery extending from the attachment end 22c side of the airbag 22 to the backrest 9a in a stowed state. Furthermore, when the airbag 22 is stowed in the backrest 9a in a rolled shape, for example, at least a portion of the airbag 22 on the side opposite to the occupant 12 seated in the vehicle seat 9 is covered by the additional folding part 22a. The attachment end 22c is secured to the frame 9b supporting the backrest 9a by means of fittings 13, as illustrated in FIG. 2. The attachment end 22c of the additional folding part 22a is positioned near the surface of the backrest 9a.

Figure 3:
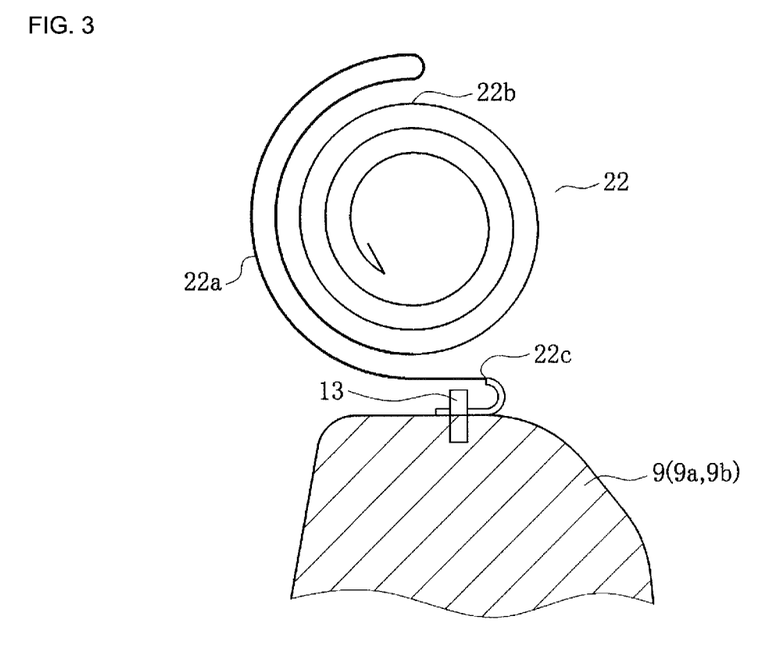
FIG. 3 is a diagram illustrating Embodiment 2 of the present invention in a state similar to FIG. 2
Figure 4:
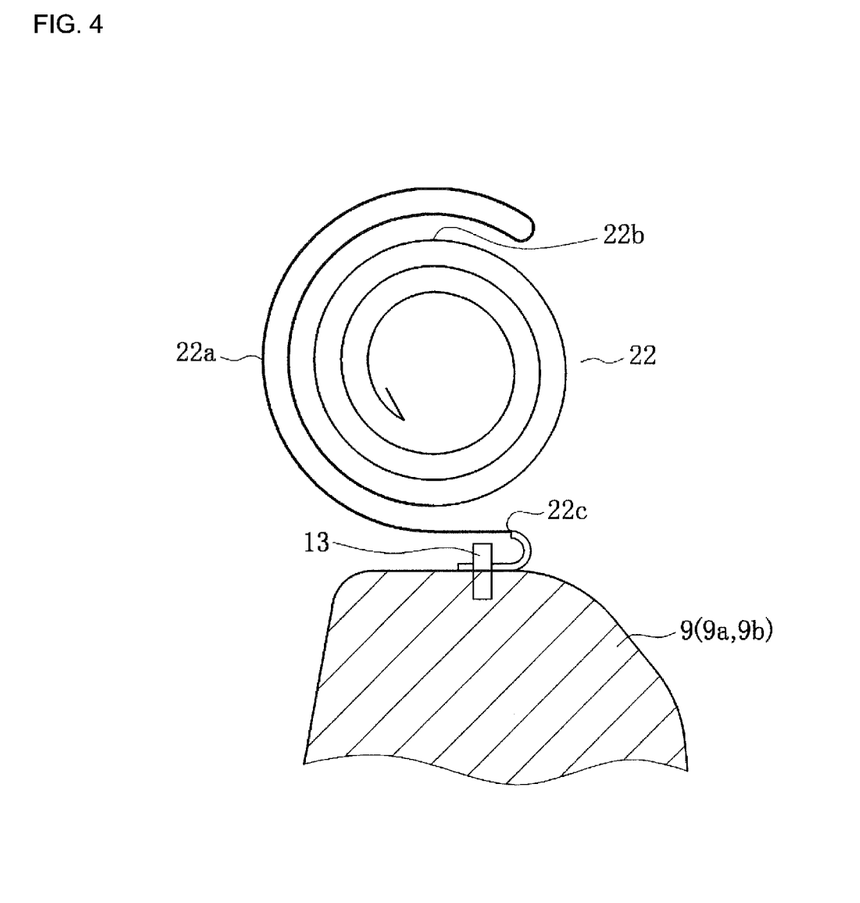
FIG. 4 is a diagram illustrating Embodiment 3 of the present invention in a state similar to FIG. 2

By appropriately adjusting the length in the front-to-back direction of the additional folding part 22a, it is possible to set which portion of the outer periphery of the airbag 22 in a stowed state is covered. In FIG. 2, the additional folding part 22a has a length enabling covering at least a portion of the rear side of the rolled or bellows-folded portion of the stowed airbag 22. For this reason, as illustrated in FIG. 2, the additional folding part 22a extends at least approximately half the circumference of the outer periphery of the airbag 22 in a rolled state on the side opposite to the occupant 12 seated in the vehicle seat 9. The additional folding part 22a extends to the vicinity of the top portion 22b along the shape of the outer periphery on the rear side of the airbag 22 in a stowed state. In addition, in FIG. 3, illustrating a preferred Embodiment, of the outer periphery of the airbag 22 rolled in a roll shape, the additional folding part 22a covers from the side opposite to the occupant 12 seated in the vehicle seat 9 to the top portion 22b. In addition, in FIG. 4, illustrating an even more preferred Embodiment, the additional folding part 22a covers from the side opposite to the occupant 12 seated in the vehicle seat 9 through the top portion 22b to the seated occupant 12 side of the outer periphery of the airbag 22 rolled in a roll shape. In FIG. 2 to FIG. 4, the occupant 12 is seated on the right side of the diagram, and the left side of the diagram is the opposite side of the occupant 12.

For example, in the airbag device 21 of the present invention illustrated in FIG. 3, when the vehicle is subjected to an impact due to a collision or rollover, and gas is emitted from the inflator 3 based on a signal from the sensor, the airbag 22 expands and deploys in the order illustrated in FIG. 5A to FIG. 5E.

The emitted gas is guided to the additional folding part 22a and the side protecting chambers 2ca through the gas guide 8, thereby expanding and deploying the additional folding part 22a and the side protecting chambers 2ca. At this time, the cross-sectional areas of the first outlet 8b and second outlet 8c of the gas guide 8 are determined so that the additional folding part 22a is expanded and deployed before the side protecting chambers 2ca. Alternatively, although not specifically illustrated, the second outlet 8c side of the head protecting chambers 2c of the gas guide 8 can be provided extending to the vicinity of the additional folding part 22a so that the second outlet 8c is provided at a position in the vicinity of the additional folding part 22a. In either method, the expanded and deployed additional folding part 22a forms a guide wall 23 that determines, for example, the direction of expansion and deployment of the head protecting chamber 2cb (see FIG. 5B).

The gas that expands and deploys the additional folding part 22a is then guided to the head protecting chambers 2cb and expands and deploys the head protecting chambers 2cb.

During expansion and deployment of the head protecting chambers 2cb, in the case of the airbag 22 illustrated in FIG.

Figure 5A:
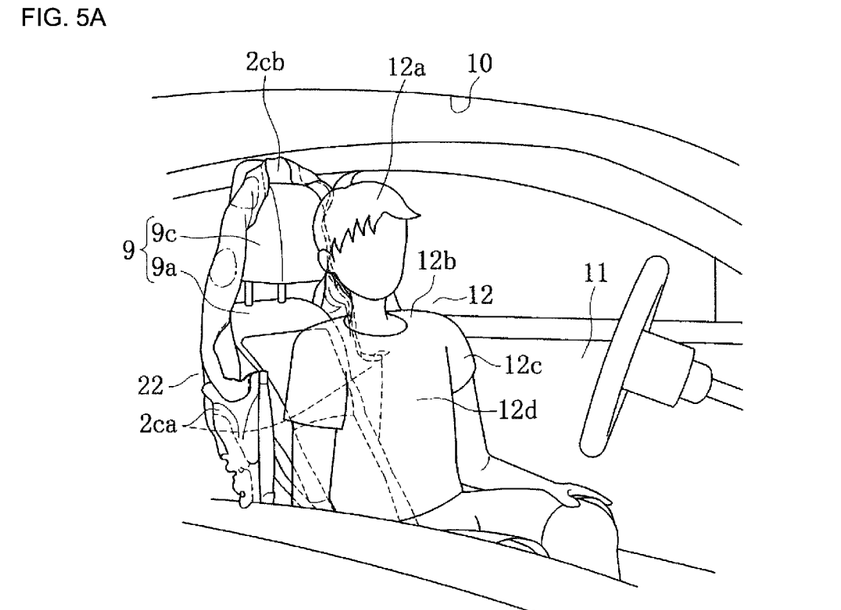
FIG. 5A is a perspective view of Embodiment 2 illustrated in FIG. 3 immediately after starting expansion and deployment.
Figure 5B:
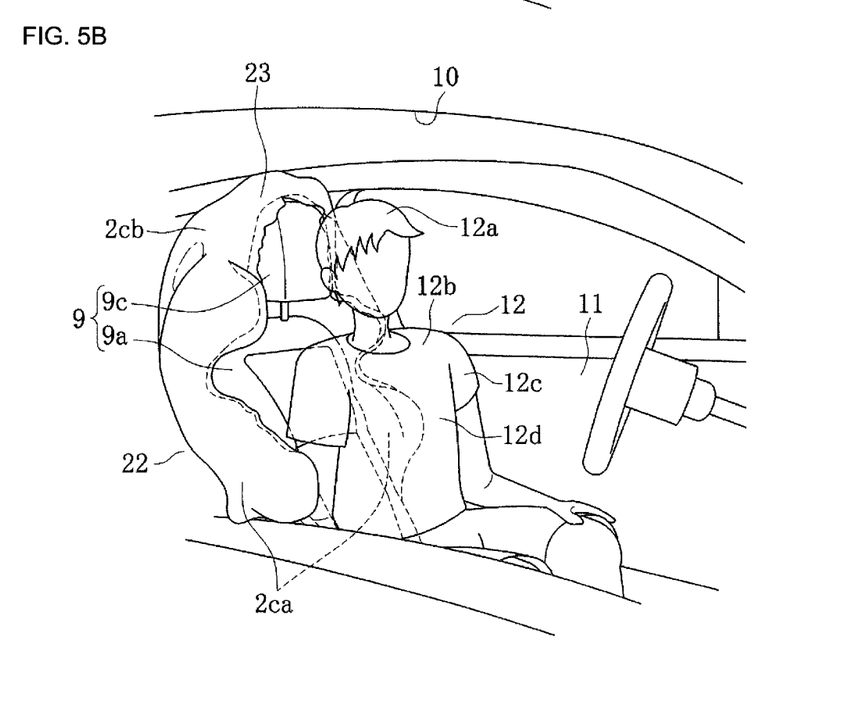
FIG. 5B is a perspective view of Embodiment 2 illustrated in FIG. 3 in the initial stages of expansion and deployment.
Figure 5C:
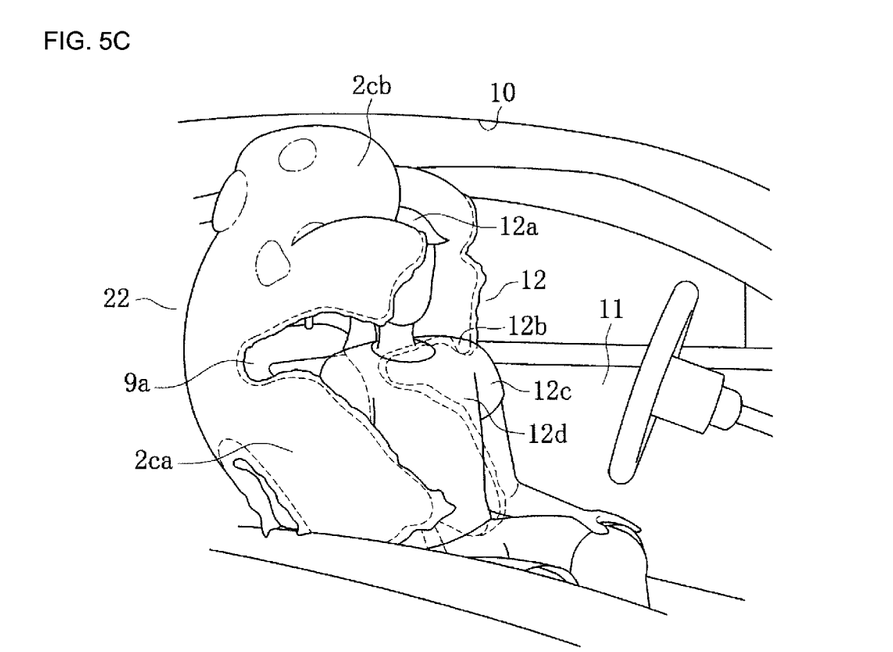
FIG. 5C is a perspective view of Embodiment 2 illustrated in FIG. 3 in the middle of expansion and deployment.
Figure 5D:
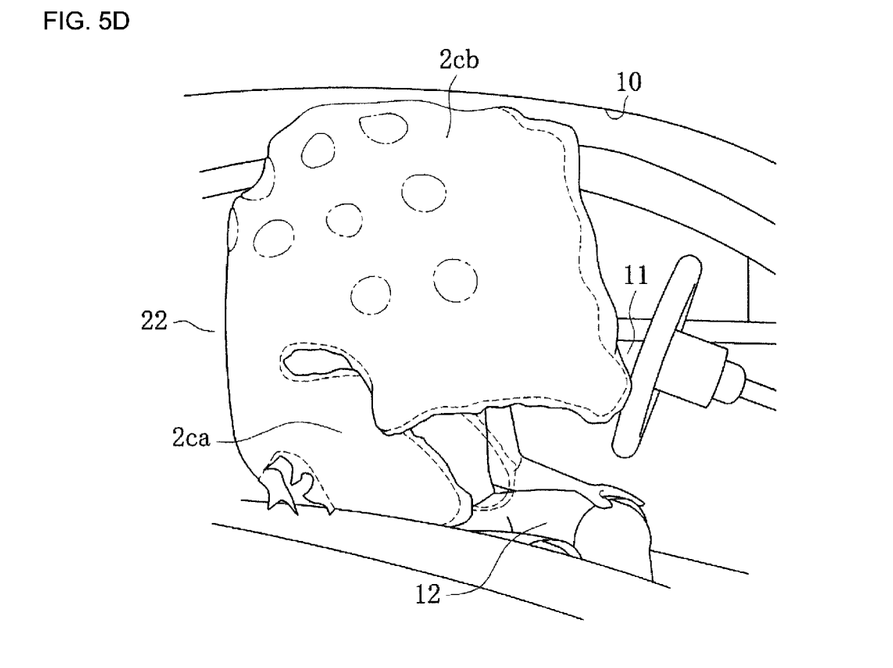
FIG. 5D is a perspective view of Embodiment 2 illustrated in FIG. 3 in the later stages of expansion and deployment.
Figure 5E:
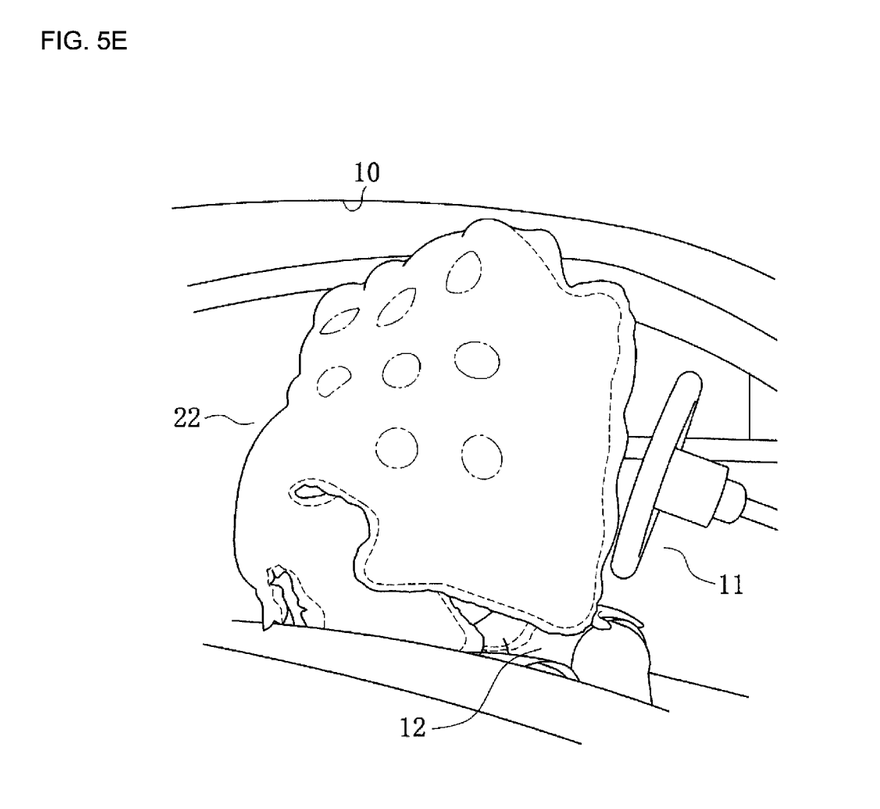
FIG. 5E is a perspective view of Embodiment 2 illustrated in FIG. 3 when expansion and deployment is completed.

1, for example, the head protecting chamber 2*cb* is guided by the guide wall 23, such that there is no interference with the roof 10 in the vehicle cabin (see FIG. 5C to FIG. 5E).

In other words, the airbag device 21 of the present invention first forms the guide wall 23 that determines the expansion and deployment direction of the airbag 22 after expansion and deployment of the additional folding part 22*a*. Therefore, there is not interference between the head protecting chambers 2*cb* that expand and deploy after the additional folding part 22*a* and the roof 11 [sic], allowing the desired protective performance to be demonstrated. Further, interference between the side protecting chambers 2*ca*, which expand and deploy substantially at the same time as the additional folding part 22*a*, and the interior parts 12 is suppressed.

Figure 6:
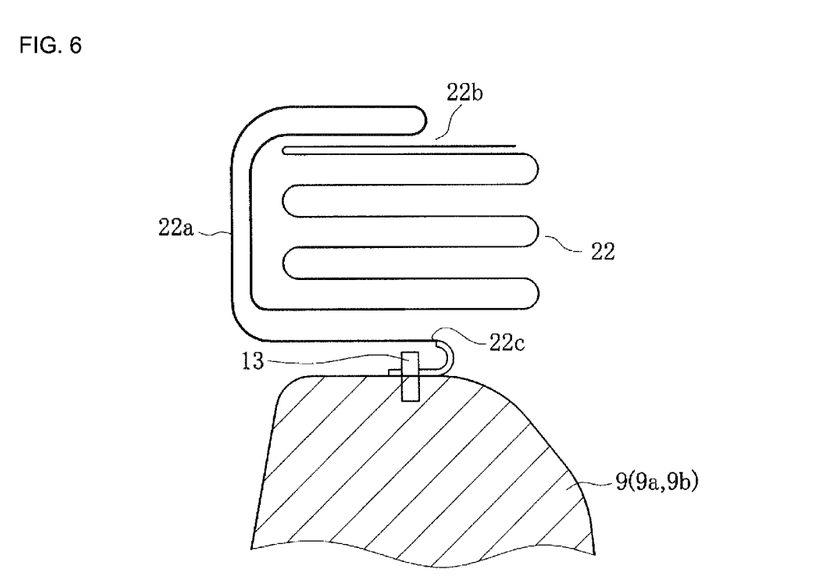
FIG. 6 is a diagram illustrating Embodiment 4 of the present invention in a state similar to FIG. 2.

The airbag device 21 of the present invention is not limited to the one in which the airbag 22 is rolled in a rolled state and stowed in the backrest 9*a* of the vehicle seat 9 as illustrated in FIG. 2 to FIG. 4, but can also be stowed in the backrest 9*a* folded in a bellows shape as illustrated in FIG. 6.

In FIG. 6, the additional folding part 22*a* is illustrated, for example, as covering the side opposite to the occupant 12 seated in the vehicle seat 9 up to the top portion 22*b*, and then as folding back so as to reach the vicinity of the upper surface of the backrest 9*a*.

However, in the case of the airbag 22 being stowed in the backrest 9*a* folded in a bellows shape, similar to being rolled in a roll shape, the additional folding part can be set to only cover the side of the airbag 22 opposite that of the occupant 12 seated in the vehicle seat 9. In addition, the additional folding part can also be set to cover from the side of the airbag 22 opposite that of the occupant 12 seated in the vehicle seat 9, over the top portion 22*b*, and to side of the occupant 12 seated in the vehicle seat 9.

Figure 7:
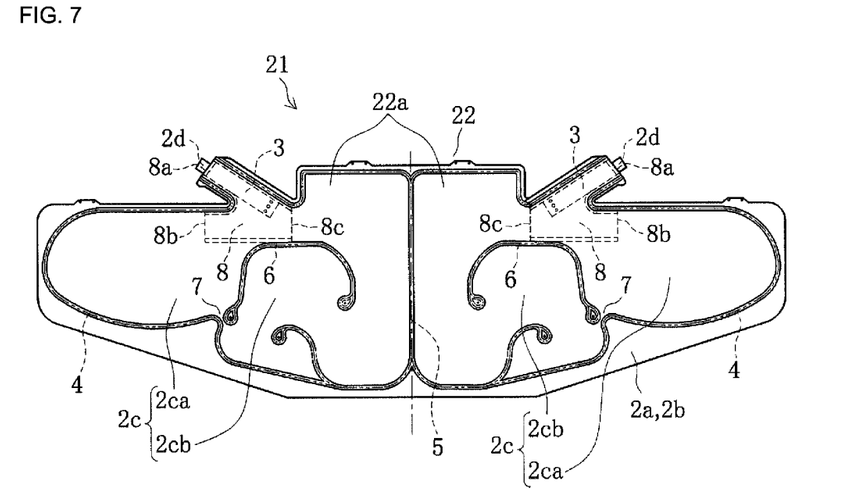
FIG. 7 is a diagram illustrating an unexpanded state of Embodiment 5 of an airbag constituting an airbag device of the present invention laid flat on a flat surface.

A modified example of the airbag 22 is illustrated in FIG. 7. In the airbag 22 of FIG. 7, the additional folding part 22*a* that covers at least a portion of the outer periphery of a stowed airbag on the side opposite to the seated occupant 12, the outer periphery extending from the attachment end side 22*c* to the frame 9*b* that supports the backrest 9*a*, is the same as the airbag 22 in FIG. 1.

The airbag 22 in a stowed state has a main deployment section that is rolled in a roll shape or folded in a bellows shape, and an additional folding part 22*a* that extends from the main deployment section to the attachment end 22*c* of the vehicle seat 9 so as to cover at least the rear side of the main deployment part (opposite side to the seated occupant 12). The main deployment section includes a head protecting chamber 2*cb* that covers the head 12*a* of the occupant 12 and side protecting chambers 2*ca* that cover the side section of the occupant 12 in the fully expanded state. Regarding the airbag 22, in the flat condition illustrated in FIG. 7, the length of the additional folding part 22*a* in the front-to-back direction is appropriately adjusted to determine the extent to which the additional folding part 22*a* covers the outer periphery of the airbag 22 in a stowed state.

The airbag 22 in FIG. 7 is the same as the airbag 22 in FIG. 1 with regards to the first outlet 8*b* of the gas guide 8 facing the side protecting chambers 2*ca*, but differs with regards to the second outlet 8*c* of the gas guide 8 being positioned near the additional folding part 22*a* and not the head protecting chamber 2*cb*. Furthermore, with the airbag 22, the cross-sectional area of the second outlet 8*c* that supplies gas to the additional folding part 22*a* is set wider than the cross-sectional area of the first outlet 8*b* that supplies gas to the side protecting chambers 2*ca*.

Figure 8:
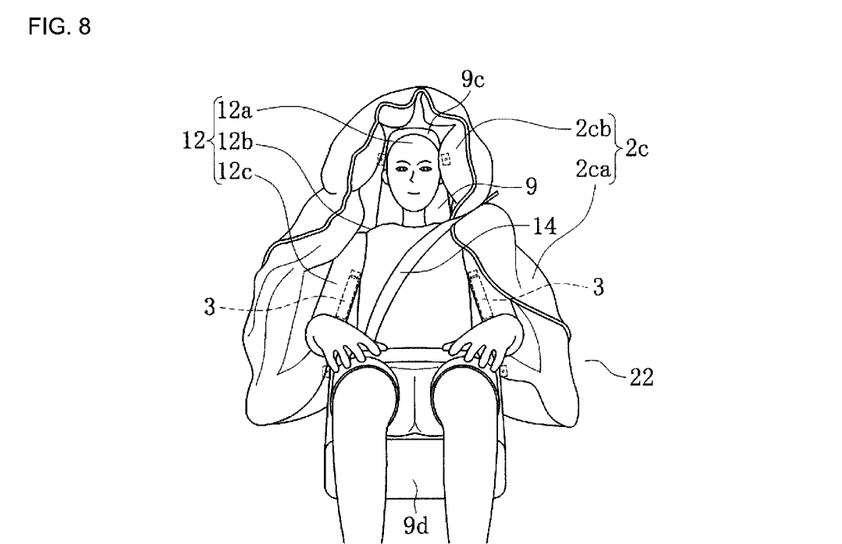
FIG. 8 is a front view of Embodiment 5 illustrated in FIG. 7 when expansion and deployment is completed.

As a result, in the airbag 22 of FIG. 7, the additional folding part 22*a* reliably demonstrates effects as a guide wall in the initial stages when expansion and deployment starts, and then the head protecting chamber 2*cb* expands and deploys, appropriately protecting the occupant 12 together with the side protecting chambers 2*ca*. With the airbag 22 of FIG. 7, there is no interference between the head protecting chambers 2*cb* and the roof of the passenger compartment or between the side protecting chambers 2*ca* and the interior parts of the passenger compartment, until the expansion and deployment is complete, as illustrated in FIG. 8. In addition, a ventilating port 24 is not provided in the sewn section 5 in the central part in the left-right direction of the airbag 2 illustrated in FIG. 7. In FIG. 8, 9*d* denotes a seat cushion and 14 denotes a seatbelt.

Needless to say, the present invention is not limited to the examples described above and the Embodiments may be appropriately changed within the scope of the technical concepts described in each claim.

In other words, the airbag device described above is a preferred example of the present invention, and Embodiments other than those described also may be implemented or executed via a variety of methods.

Unless otherwise specified in the specification of the present application, there are no limitations to the shape, size, configuration, arrangement, and the like of the components illustrated in the attached drawings in the present invention. Furthermore, expressions and terms used in the specification of the present application are for the purpose of description and are not limiting unless otherwise specified.

For example, in the Embodiments illustrated by FIG. 1 to FIG. 8, the additional folding part 22*a* is provided to be expanded and deployed prior to the expansion and deployment of the head protecting chambers 2*cb*, however, an additional folding part 22*a* that expands and deploys prior to the expansion and deployment of the side protecting chambers 2*ca* may be further provided.

Furthermore, the airbag 22 illustrated in FIG. 1 and FIG. 7 is provided with the gas guide 8. However, the gas guide 8 may be omitted so long as the gas from the inflator 3 is reliably guided through the additional folding part 22*a* to the side protecting chambers 2*ca* and head protecting chamber 2*cb*.

In the Embodiments illustrated by FIG. 1 to FIG. 8, the airbag device 21 is attached to the seat in which the seated occupant faces forward in the vehicle. However, the airbag device 21 can also be attached to a seat in which the seated occupant faces rearward in the vehicle. Such a vehicle seat 9 can be provided in a vehicle with automatic driving.

In addition, the airbag device 22 that protects the head 12*a* of the occupant 12, and the side sections of the shoulder 12*b*, upper arm 12*c*, and chest 12*d* of the occupant 12, is described in the Embodiments illustrated in FIG. 1 to FIG. 8. However, the present invention may be applied to an airbag device that protects the head 12*a* of the occupant 12, and the side sections of the abdomen and waist of the occupant 12 in addition to the shoulder 12*b*, upper arm 12*c*, and chest 12*d* of the occupant 12.

Furthermore, the airbag 22 described in FIG. 1 and FIG. 7 is formed by stitching two sheets together, but may also be formed using a so-called "one-piece weaving" technique.

DESCRIPTION OF CODES

2*ca*: Side part protection chamber
2*cb*: Head region protection chamber
3. Inflator 9. Vehicle seat
9a. Backrest
12. Occupant
12a. Head
21. Airbag device
22. Airbag
22a. Additional folding part
22b. Top portion
22c. Mounting end

The invention claimed is:

1. An airbag device, the airbag device comprising:
an airbag that expands and deploys to integrally cover the head and side sections of an occupant seated in a vehicle seat; and
an inflator that supplies gas to the airbag,
wherein the airbag includes:
a head protecting chamber that covers the head of the occupant and side protecting chambers that cover the side sections of the occupant when the airbag is in an expansion completed state where expansion and deployment are completed; and
in a state where the airbag is stowed rolled in a roll shape or folded in a bellows shape, and stowed in a backrest of the vehicle seat from a first side to a second side over a top part, there is an additional folding part extending from the outer periphery of the attachment end side of the stowed airbag to the backrest, where the additional folding part is provided covering at least a portion of the rear side of the stowed airbag that is rolled in a roll shape or folded in a bellows shape,
wherein a free end of the additional folding part is secured directly to a top-most exterior surface of the vehicle seat.

2. The airbag device according to claim 1, wherein the additional folding part is provided so as to extend from the vicinity of the surface of the backrest to the vicinity of the top part along the shape of the outer periphery of the rear side of the stowed airbag, and is folded downward in the vicinity of the top part, reaching the vicinity of the surface of the backrest.

3. The airbag device according to claim 1, wherein the additional folded portion is provided to further cover the top portion of the stowed airbag.

4. The airbag device according to claim 3, wherein the additional folding part is provided so as to also cover a portion of the top part of the front side of the stowed airbag, which continues from the top portion over the top portion thereof.

5. The airbag device according to claim 1, wherein the additional folding portion is provided at least in a portion corresponding to the head protecting chamber.

6. The airbag device according to claim 3, wherein the additional folding part is provided at least in a portion corresponding to the head protecting chamber.

7. The airbag device according to claim 4, wherein the additional folding part is provided at least in a portion corresponding to the head protecting chamber.

8. The airbag device according to claim 1, wherein the free end of the additional folding part is secured to the top surface of the vehicle seat via an attachment end.

9. The airbag device according to claim 1, wherein the airbag is rolled about an axis extending in a width direction of vehicle seat when the airbag is stowed.

10. The airbag device according to claim 1, wherein the airbag includes first and second chambers that are symmetrical to one another about a longitudinal centerline of the airbag.

11. The airbag device according to claim 10, wherein the first and second chambers are inflated by first and second inflators, respectively.

12. The airbag device according to claim 1, wherein the additional folding part extends at least approximately half a circumference of an outer periphery of the airbag in a rolled state of a side adapted to be disposed opposite the occupant.

13. The airbag device according to claim 1, wherein the airbag in a stowed state has a main deployment section that is rolled in a roll shape or folded in a bellows shape, the additional folding part extending from the main deployment section to an attachment end for attachment to the vehicle seat so as to cover at least a side of the main deployment part adapted to be disposed opposite the occupant.

14. The airbag device according to claim 1, in combination with the vehicle seat.

* * * * *